June 2, 1959     E. C. WARRICK ET AL     2,888,707
UNIVERSAL CASTER ASSEMBLY FOR LEG SUPPORTED STANDS
Filed June 2, 1954     2 Sheets-Sheet 1
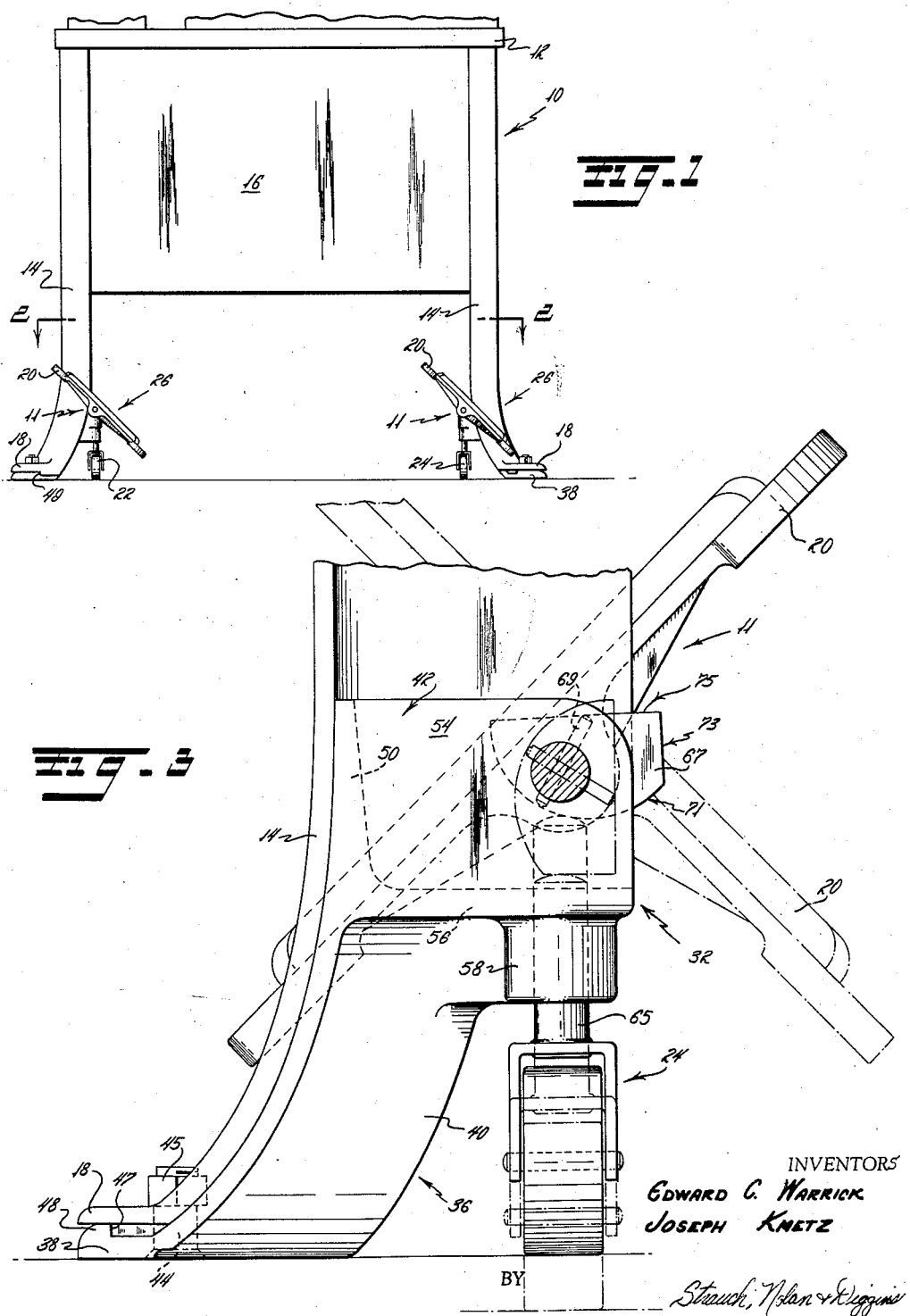
INVENTORS
EDWARD C. WARRICK
JOSEPH KNETZ
BY
Strauch, Nolan & Diggins
ATTORNEYS

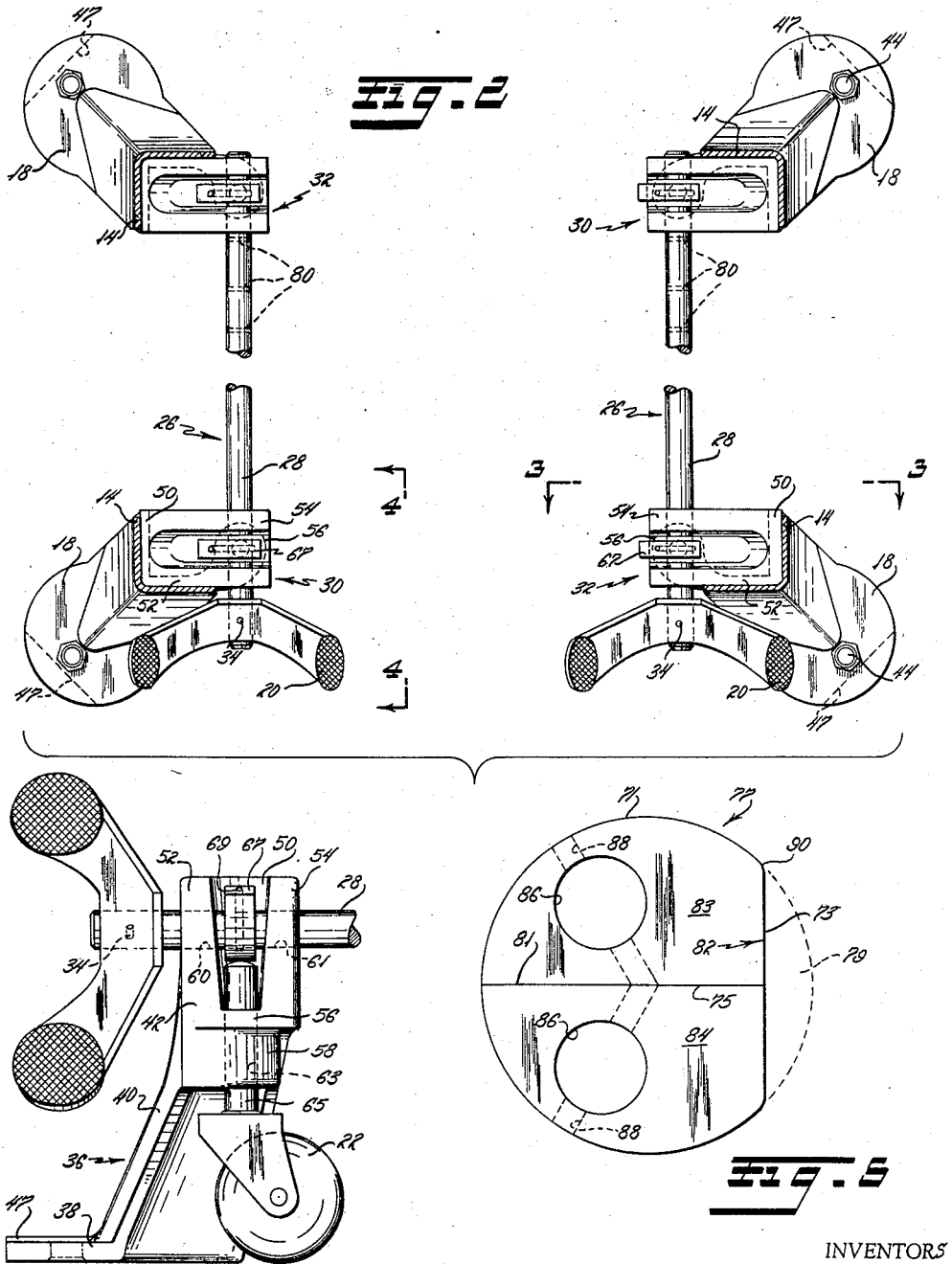

United States Patent Office 2,888,707
Patented June 2, 1959

2,888,707
UNIVERSAL CASTER ASSEMBLY FOR LEG SUPPORTED STANDS

Edward C. Warrick, Pittsburgh, and Joseph Kmetz, Rankin, Pa., assignors to Rockwell Manufacturing Company, Pittsburgh, Pa., a corporation of Pennsylvania Application June 2, 1954, Serial No. 434,011

3 Claims. (Cl. 16—33)

This invention relates to caster assemblies and more particularly to retractable caster wheel assemblies for use on power tool stands and the like to facilitate movement thereof from place to place.

The limited work space available in many home and other workshops often requires that power tools such as bench saws and the like used in the shop be moved back out of the work area into a storage space when the work with the tool has been completed to clear the shop working area for use of other tools or for other purposes. The combined weight of the power tool and its stand is such that movement is difficult unless the stand is provided with suitable roller means. Conventional casters can not satisfactorily be used because, even if the locking type, they do not provide adequately firm footing for the tool stand during operation of the power tool carried thereby.

It, accordingly, is the purpose of the present invention to provide power tool stand caster assemblies which facilitate movement of the stand and tool from place to place and yet permit a firm set up of the stand during operation of the tool mounted thereon.

In accordance with the invention, power tool stands are provided with casters adapted to be moved vertically relative to the stand legs into or out of engagement with the floor, to thereby lift the stand from the floor and onto the casters for movement of the stand and to lower the stand so that is feet rest firmly on the floor for operation of the power tool.

It is another object of this invention to provide new and improved retractable caster assemblies for use on power tool stands and the like characterized by simplicity of structure and operation, ruggedness and economy of manufacture.

A further object of this invention is the provision of novel retractable caster assemblies wherein the casters may be conveniently and easily moved between inoperative and operative positions and firmly locked in the latter position.

It is also an object of this invention to provide new and improved retractable caster assemblies adapted to be quickly and easily attached to existing power tool and like stands of different widths and lengths.

Another object of this invention is the provision of novel cam elements for use in the retractable caster assemblies of our invention.

These and other objects, features and advantages of the invention will become more fully apparent by reference to the appended claims and the following detailed description when read in conjunction with the accompanying drawings, wherein:

Figure 1 is a front elevation of a power tool stand equipped with the retractable caster assemblies of our invention;

Figure 2 is a horizontal sectional view taken on the line 2—2 of Figure 1 and showing the caster assemblies in plan;

Figure 3 is a sectional view taken on the line 3—3 of Figure 2 and showing one of the caster support units with the caster in both retracted and extended positions;

Figure 4 is a front elevation of a caster support unit as viewed in the direction indicated by arrows 4—4 in Figure 2 and omitting the associated stand leg; and Figure 5 is a plan view of a pair of cam elements and illustrates their method of manufacture.

With continued reference to the drawings, wherein like reference numerals are used throughout to designate like parts, Figure 1 shows a power tool stand 10 of conventional type equipped with the retractable caster assemblies 11 of our invention.

Power tool stand 10 includes a flat table surface 12 supported on legs 14 and adapted to mount a power tool and its motor or other devices (not shown). The legs of stands like that shown commonly are provided with cross braces, such as the sheet metal panels indicated at 16. These braces in some types of stands serve merely to brace the legs and in others serve also to define a closed motor housing or storage space below the table surface and between the stand legs. As best shown in Figure 2, stand legs 14 are formed of L-section angle iron or the like and are curved outwardly and flattened adjacent their lower ends to form outwardly disposed support feet 18.

The retractable caster assemblies 11 of this invention fit within the space between the stand legs and include foot treadles 20 located exteriorly of the legs in a position such that they may easily be manipulated by the foot of the operator to selectively retract or extend the associated casters 22 and 24. In Figure 1 the casters are shown retracted and the treadles 20 in the positions which they occupy when the casters are retracted. Rotation of treadles 20 in a counterclockwise direction (Figure 1) will force casters 22 and 24 downwardly and thus lift the stand onto the casters in a manner which will be more fully described hereinafter. Means are provided to automatically lock the casters in supporting position to permit movement of the stand without danger of the casters retracting and permitting the stand feet to drop to the floor. After the stand has been moved to the desired position the foot treadles may be rotated in the reverse (clockwise) direction to retract the casters and permit the stand feet to lower and against rest in supporting position on the floor, to thus provide a firm footing for the stand during operation of the power tool carried thereby.

As shown in Figure 2, wherein the casters have been omitted for purposes of clarity, the caster retraction and extension mechanism of our invention consists of a pair of caster assemblies 26, one for each side of the stand, each assembly being fitted to one pair of the tool stand legs 14. Each caster assembly consists of an actuating shaft 28 extending between and journaled in a pair of caster support blocks 30 and 32. One end of each shaft 28 extends beyond the adjacent caster support block and carries on its extended end one of the foot treadles 20 fixed thereto as by a pin 34 or the like. The support blocks 30 and 32 of each caster assembly 26 are of similar structure but reversed from left to right so that each is the mirror image of the other. Thus, the support blocks at the stand legs diagonally opposite each other are identical and interchangeable, while those at the legs directly opposite each other are similar but of opposite "hand." It is necessary, therefore, to provide one pair of support blocks 30 and one pair of support blocks 32 of opposite "hand," for a tool stand having four legs as in Figure 2.

The structure of each of these support blocks is best shown in Figures 3 and 4, the associated tool stand leg being omitted from the latter figure for purposes of clarity. Support block 32 comprises a support frame indicated generally at 36 and made up of a base portion 38, shank portion 40 and caster stem journal portion 42.

The base portion 38 of support frame 36 underlies the foot 18 of the associated stand leg and is secured thereto as by a stud 44 extending through aligned bores in foot 18 and base 38 and provided with a nut 45 adapted to be turned down on the stud to clamp the foot and base firmly together. Base portion 38 may be relieved as shown at 47 (Figures 2 and 3) so that when the stud and bolt are tightened base 38 will tend to pivot about the point of engagement of its non-relieved portion 48 with the flat undersurface of foot 18, and thus urge the shank portion 40 of support frame 36 more firmly into engagement with the inner side of the associated tool stand leg 14. Shank 40 is preferably made of angle section and curvature corresponding to the inner surface of leg 14 so as to interfit snugly therewith when the support frame is secured to the leg.

Alternatively, the under-surfaces of the stand feet 18 may be relieved at the outer edges thereof which overlie the non-relieved portions of the support frame base portions 38, this arrangement being illustrated at the lefthand side of the stand shown in Figure 1. With this arrangement, the stand feet and support frames have interengaging abutment surfaces as at 49 in Figure 1, which serve to properly position the support frames 36 with respect to feet 18 and to reduce shearing stresses on studs 44. These stresses arise from the upward pull on shank portions 40 of the support frames when the casters are in their downwardly extended position and are supporting the weight of the stand. It is to be noted that since the caster stems are journaled inwardly of shank portions 40 and feet 18, they also exert an outward force on the shank portions 40 to urge these elements firmly into engagement with the inner sides of the table legs.

Support frame 36 includes a caster stem journal portion 42 formed integrally with the upper end of shank portion 40 and extending inwardly with respect to the associated stand leg 14. The caster stem journal consists of three generally vertically extending wall members 50, 52, and 54, and a bottom wall member 56 having a downwardly extending circular boss or projection 58, the several wall members preferably being integrally formed with shank portion 40 of the support frame. Vertical walls 52 and 54, as best shown in Figure 4, define an upwardly divergent recess and are provided with aligned horizontal bores 60 and 61 therethrough journalling an end portion of shaft 28. Bottom wall 56 and its integral boss or projection 58 are provided with a vertical bore 63 therethrough centered on the axis of bores 60 and 61. Bore 63 slidably and rotatably receives the stem 65 of a caster wheel 24 of conventional type. The upper end of stem 65 protrudes into the recess between the vertical walls 52 and 54. This recess above the end of caster stem 65 receives a cam element 67 which is secured to shaft 28 as by a pin 69 passing through the shaft and cam or by other convenient fastening means. Rotation of the shaft and cam element is facilitated by the upward divergence of the walls 52 and 54, which assures a minimum of frictional contact between the cam and wall members which retain the cam properly centered between them.

As best shown in Figure 3, the camming surface of cam 67 includes a circularly curved surface 71 subtended by planar surfaces 73 and 75 substantially normal to each other. In Figure 3, the solid lines show caster 24 and cam 67 in respective retracted position and the phantom lines show the caster and cam in extended position. The corresponding positions of treadle 20 and cam 67 are similarly shown in Figure 3. As is apparent from this figure, the camming surface of cam 67 engages the stem end of caster 24 to cause downward "jacking" movement of the caster upon rotation of the cam in a clockwise direction. The caster stem engages the circularly curved portion 71 of the camming surface when in the retracted position shown in full lines and until the caster reaches its fully extended position at which time the planar portion 73 is brought into contact with the caster stem end as shown in phantom lines in Figure 3. The shape of the camming surface of the cam is such that when the cam is rotated into this latter position it is held against any accidental reverse rotation which would retract the caster and lower the stand.

In order for the cam to turn back and permit the caster to retract it is first necessary that it further raise the tool stand sufficiently to permit the caster stem to ride over the line of juncture of the planar and circularly curved cam surfaces. The weight of the stand and the tool carried thereby thus assists in preventing retraction of the casters until such time as it is desired to retract them. Retraction may then be accomplished by exerting sufficient foot pressure on treadles 20 in a counterclockwise direction to rotate the cams and raise the stand slightly so that caster stems 62 can ride over the high points on the camming surfaces and thereafter counterbalancing the weight of the stand acting through caster stems 65 to slowly turn cams 67 into the position shown in solid lines in Figure 3 thereby slowly lowering the stand feet until they are resting on the floor and the casters are carrying none of the weight of the stand.

The height to which the stand feet are elevated by extension of the casters is determined both by the configuration of the cams 67 and by the length of the caster stems 65. With cams of given shape and size such, for example, as shown in Figure 3, it is possible to vary the range of caster movement and thus of stand elevation by making the caster stems either longer or slightly shorter than those shown. The caster stems should not be so short that the stand feet fail to clear the floor when the casters are extended by rotation of cams 67 into the position shown in phantom lines in Figure 3, nor should they be so long that the stand feet do not rest firmly on the floor when the casters are retracted by rotation of cams 67 into the position at which their camming surfaces permit maximum rise of the caster stems, which cam position is about 30° counterclockwise of that illustrated in solid lines in Figure 3. Between these limits, the length of the caster stems may be varied to modify the range of vertical movement of the casters, and, accordingly, of the stand feet. The amount of clearance between the stand feet and floor when the casters are in their extended position may thus be adjusted to best suit particular applications and floor conditions.

As shown in Figure 2, the two caster support units 30 and 32 of each pair are interconnected into a unitary assembly by the associated shaft 28 journaled in the units and held therein by the cams 67 fixed on the shaft. Each of the shafts 28 may if desired be provided on its end opposite the foot treadle with a plurality of axially spaced additional bores 80 adapting the caster support assemblies to use on power tool stands of different sizes. Thus, if it is desired to fit the caster assemblies to a smaller stand, the support units thereof opposite treadles 20 are moved further onto the shaft and fixed in such inward position by placing the cam pin 69 into the appropriate one of these additional shaft bores 80.

It is to be noted that the caster support assemblies may be mounted on the tool stand with the foot treadles positioned at either side or, if desired, at the front or rear of the stand, whichever is more convenient for the operator. It also is possible to arrange the two foot treadles so that when the casters controlled thereby are in like positions the treadles will either be parallel to each other as shown in Figure 1 or be oppositely inclined and rotatable in opposite directions to raise or lower the casters. Where the treadles are arranged parallel as in Figure 1 the cams 67 on the two shafts 28 will both face in the same direction and the two shaft and cam assemblies will, therefore, be identical to each other; where the treadles are arranged oppositely inclined the cams on one of the shafts will be reversed with respect to those on the other and so will face in the opposite direction. Thus, by proper arrangement of cams 67 and treadles 20 on the shafts 28 of the right and left-hand caster assemblies, the two treadles may be made either parallel and rotatable in the same direction or oppositely inclined and rotatable in opposite directions to raise or lower the casters.

We have found that cams of the type shown in Figure 3 may conveniently be fabricated in the manner illustrated in Figure 5. Starting with a circular disc 77 of appropriate thickness and of a diameter such as to provide a circularly curved camming surface of desired radius of curvature, a minor segment 79 of the disc indicated by dotted lines is sawed or otherwise cut therefrom along a chord line 82 of the disc. The disc is then cut as by sawing along the diameter 81 thereof perpendicular to the chord 82, to thus form two identical cam elements 83 and 84. The cam elements may then be drilled to provide bores 86 for the shafts on which they are to be mounted and bores 88 for the locking pins for fixing them to the shafts. The line of juncture between the circularly curved surface 71 and planar surface 75 may if desired be slightly rounded, as indicated at 90 in Figure 5, to permit easier movement of the caster stem which engages these surfaces from one surface to the other upon rotation of the cam.

Instead of starting with a disc as described above, it also is possible to produce the cams from a relatively long rod of circular cross section. The rod is first cut lengthwise to remove a minor segment of the circular cross section thereof, then may be drilled lengthwise of the rod to provide the two shaft bores 86. The rod is next cut along its diameter normal to the chord along which said segment was removed, and the junction between camming surfaces 71 and 73 rounded as by grinding or other machine operation. The two rod portions thus formed may then be cut transversely of their lengths into cam elements of the desired width, and the cam elements drilled to provide the bores 88 for the shaft pins. The sequence in which these steps are carried out may be varied, if desired, to better suit particular conditions and available metal working machines.

From the foregoing it will be apparent that we have developed new, novel and highly advantageous retractable caster assemblies for use on power tool stands and the like. While the retractable caster assemblies of our invention have been described with particular reference to power tool stands, it is to be understood that these caster assemblies are not restricted to use on such stands but may equally well be used on stands, tables and supports of other types, wherever there is a need for retractable casters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and wish to protect by United States Letters Patent is:

1. As an article of manufacture, a retractable caster assembly comprising a pair of spaced apart support blocks having a floor engaging base, a journal portion formed integrally near the upper end of each support block and having divergent opposed walls to form a divergently opposed walled recess, each of said journal portions defining a vertical bore extending therethrough and centered between the divergent opposed walls to intersect said divergently walled recess, said divergent opposed walls having horizontally aligned bores intersecting said recess, a caster stem journalled in each of said vertical bores for reciprocal movement therein and having an upper end extending into its respective recess, a caster carried by each of said stems on the lower end thereof, a rotatable shaft extending between said blocks and through said aligned bores to be journalled in said horizontally aligned bores, means for rotating said shaft, a cam element having vertically standing parallel sides and non-rotatably mounted on the portions of said shaft lying in each of the respective recesses for operative engagement with said upper end of a respective caster stem, the edges formed by the periphery of each of said cam elements and its parallel sides being disposed to make line contact with respective ones of said divergent opposed walls to limit axial movement of said shaft thereby maintaining said cam elements aligned with their respective associated caster stems and in minimal frictional contact with said walls at all times to permit substantially free rotation of said shaft and said cams in operation of said assembly.

2. As an article of manufacture, a retractable caster assembly comprising a pair of spaced apart support blocks each having a floor engaging base portion, an angle iron shank portion extending upwardly from said base portion, a web-like, horizontally disposed journal portion formed integrally with said shank portion and extending adjacent the upper end thereof and defining upstanding substantially right angularly intersecting walls at one side and one end of said journal portion, said walls along said sides having divergent opposed faces and horizontally disposed journal bores, a boss-like socket member extending downwardly from each of said web portions and defining a vertical bore extending therethrough, the axis of each of said vertical bores being disposed to intersect with the axis of said horizontally disposed journal bore; a caster stem journalled in the vertical bore of each support block for reciprocal movement therein and having an upper end projecting beyond respective ones of said web-lke journal portions; a caster carried by each of said stems on the lower end thereof; a rotatable shaft extending between said blocks and through said horizontally disposed journal bores to join said pair of support blocks in assembled relation with their respective divergent wall faces in relative opposed relation with said shaft journalled in said horizontally disposed journal bores; means for rotating said shaft; a cam element having vertically standing parallel side faces mounted on the portions of said shaft substantially overlying said caster stems for operative engagement with said upper end of a respective stem, at least one edge of each of said cam elements formed by the periphery of said cam element and an intersecting parallel side face being disposed to make line contact with the respective adjacent divergent wall face to thereby limit axial movement of said shaft in opposite directions to maintain said cam elements vertically aligned with its respective caster stems and in minimal frictional contact with said upstanding divergent wall faces at all times to permit substantially free rotation of said shaft and said cam elements in cooperation of said assembly.

3. A retractable caster unit for use on a leg stand support provided with lower angle iron end portions, comprising: a pair of spaced apart caster support blocks each having a floor engaging base portion adapted to be attached to one of said lower end portions of said leg stand support; an angle iron shank portion comprising two outwardly facing intersecting walls extending upwardly from each of said base portions and adapted to snugly interfit and abuttingly engage with the underside of respective ones of said lower angle iron end portions of said leg stand support substantially along the entire surface of said shank portion remote from respective ones of said base portion; a web-like, horizontally disposed journal portion formed integrally at the upper end of said shank portion comprising upstanding substantially right angularly intersecting walls at one side and one end of said journal portion complementary with said angle iron shank portion to form a substantially smooth continuous surface with said shank portions, said walls along said sides having divergent opposed faces and horizontally disposed journal bores extending therethrough, and a boss socket extending downwardly from each of said web portions to define a substantially vertical bore extending therethrough, the axis of said vertical bore intersecting the axis of said horizontal bore above said web-like wall portion, a caster stem journalled in each of said vertical bores for reciprocal movement therein having an upper end extending above said web portion; a caster carried by each of said caster stems on the outer end thereof; a rotatable shaft extending between said support blocks and journalled in each of said horizontally disposed journal bores of respective ones of said support blocks to join said pair of support blocks in assembled relation with their respective divergent wall faces in relative opposed relation with said shaft; a cam element having vertically standing parallel side faces mounted on each portion of said shaft overlying said vertical bores for operative engagement with the upper end of a respective caster stem, the outer edge of each of said cam elements formed by the periphery of said cam element and outer intersecting side face thereof being disposed to make line contact with respect adjacent divergent wall faces to thereby limit axial movement of said shaft in opposite directions to maintain said cam elements vertically aligned with its respective caster stem and in minimal frictional contact with said upstanding divergent wall faces at all times to permit substantially face rotation of said shaft and said cam elements in operation of said unit.

References Cited in the file of this patent

UNITED STATES PATENTS

| | | |
|---|---|---|
| 280,273 | Wilson | June 26, 1883 |
| 329,586 | Montres | Nov. 3, 1885 |
| 443,260 | Preston | Dec. 23, 1890 |
| 654,776 | Barber | July 31, 1900 |
| 940,606 | Medart | Nov. 16, 1909 |
| 940,749 | Sweet | Nov. 23, 1909 |
| 1,092,220 | Koch et al. | Apr. 7, 1914 |
| 2,343,253 | Clark | Mar. 7, 1944 |
| 2,490,953 | Eriksen | Dec. 13, 1949 |
| 2,671,242 | Lewis | Mar. 9, 1954 |
| 2,735,130 | Unsworth | Feb. 21, 1956 |

FOREIGN PATENTS

| | | |
|---|---|---|
| 1,640 | Great Britain | of 1871 |

OTHER REFERENCES

Retractable Caster, page 217 of Popular Mechanics, January 1953.